Aug. 17, 1948. T. MILLER 2,447,201
TRACER AND TRACER CONTROLLED OPERATION OF
MACHINE TOOLS AND OTHER CUTTING MACHINES
Filed Dec. 13, 1943 4 Sheets-Sheet 1

Fig. 1.

Inventor
THEODORE MILLER

By Peck & Peck
Attorneys

Patented Aug. 17, 1948

2,447,201

UNITED STATES PATENT OFFICE 2,447,201

TRACER AND TRACER CONTROLLED OPERATION OF MACHINE TOOLS AND OTHER CUTTING MACHINES

Theodore Miller, Racine, Wis., assignor to George Gorton Machine Co., Racine, Wis., a corporation of Wisconsin Application December 13, 1943, Serial No. 514,125

15 Claims. (Cl. 90—13.5)

This invention relates to improvements in tracers for pattern controlled, duplicating milling, or profiling or other cutting machines and particularly concerns those machine tool types wherein certain machine movements are controlled and actuated by electromagnetic clutches rotatable in either direction, through the medium of power driven rotary lead screws and the respective slides propelled thereby, with a pattern-scanning tracer included in and selectively controlling the several electromagnetic clutch actuating circuits.

One of the objects of the invention is to provide a tracer which is less susceptible to deflections caused by vibrations of the machine and inherent inertia of the parts while remaining sensitive to changes in the contour of the pattern.

A further object of the invention is to provide a tracer which is highly sensitive under low operating pressures and minute movements of the operative parts of the tracer.

A further object of the invention is to provide a tracer which is compact and requires a minimum amount of vertical space and still be sensitive in operation.

A still further object of the invention is to provide a tracer which will rapidly and accurately restore itself to substantially the same null or neutral position and also have limited universal lateral movement from that position.

The foregoing objects are accomplished by suspending the tracer finger for universal movement about a fulcrum, using a resilient metal diaphragm to thus support the finger and also constantly urge it to a null position, providing the finger with a lever arm adapted to operate the controls for the required machine movements, restricting the length of the finger so that the vibrations of the machine will not overcome the resistance of the diaphragm and cause the finger to oscillate, and limiting the length of the lever arm to substantially less than the length of the finger.

With the foregoing and other objects in view, developed by the following description, the invention consists in certain novel advantageous structural organizations and features, as well as combinations and sub-combinations, as more fully explained hereinafter and specified by the following claims.

Referring to the accompanying drawings forming a part hereof.

Without intending to so limit the adaptability of the instant invention, merely as an example, I show the invention adapted to and included in a vertical milling machine provided with a duplicator tracer arm and spindle such as disclosed by Patent No. 2,005,696 issued June 18, 1935, to George Gorton Machine Co.

In the machine tool of the so-called duplicator type, disclosed in part by the instant drawings, the machine frame or column 1 provides a normally-rigid, supporting part or head or ram 2 that projects forwardly and overhangs the horizontal work table 3 longitudinally slidable in a straight line toward the right and left on a saddle 4 by which said table is carried transversely or in and out on a horizontal straight line path of movement perpendicular to the horizontal straight line path of movement of the longitudinal table movement.

The work $w$, and the pattern $p$, are both normally fixed on the top of the table 3. The saddle 4 is suitably mounted on the machine frame vertically adjustable on the machine frame 1 for its straight transverse, front and rear, or in and out straight line movements.

The ram 2 at its front end provides a relatively fixedly located vertical cutter head 5 that carries the vertical rotatively-driven cutter spindle 6 depending over said table and the vertical slide or quill 7 in which said spindle is mounted and by which it is raised and lowered. The cutter head and its spindle 6 are normally held against lateral movements.

In this particular example, the vertical tracer spindle is carried and normally fixedly held against lateral movements by a rigid arm 9 fixed to the cutter head 5 and projecting laterally therefrom to maintain the tracer spindle in normally fixed spaced relation with respect to the cutter spindle. The free end of this arm 9 provides a vertical slideway 10 fixed with respect to said arm in which the tracer spindle 8 is confined to straight line vertical sliding movements. The lower end of said tracer spindle 8 is provided with any suitable chuck or collet 11 by which the shank of the tracer mechanism is removably and normally fixedly held by and depended from its spindle over the pattern or master p fixedly located on the table 3.

This example provides manually operated means by which the vertical cutter and tracer spindles can be simultaneously as a unit moved down into operative relationship with the work and pattern fixed on table 3 and upwardly therefrom. For this purpose, in this particular example, longitudinal series of gear teeth in the quill of the cutter spindle and in the quill of the tracer spindle are provided in mesh with geared pinions rigid with a rotatable cross shaft 12 mounted in the cutter and tracer heads and extending through the arm 9. This rotary cross shaft 12 is provided with one or more handwheels or exterior radial handle 13 by which the shaft can be rotated by hand in either direction.

The cutter spindle and tracer spindle are preferably normally held against relative lateral movements and are maintained in fixed spaced relation while in operation. The work and pattern are fixed on the work table 3 in the same spaced relation as the cutter spindle and tracer. Thus, in operation, the table 3 is moved horizontally and longitudinally toward the right or left with respect to the saddle, and horizontally in and out with respect to the knee to cause the contouring tracer finger or stylus to follow the outline of or scan the pattern and the cutter to correspondingly operate on the work.

The work table 3, and the saddle 4, are in this example carried by the ordinary or any suitable vertically adjustable knee 14 that provides a transverse guideway confining the saddle to its transverse straight line path of movements, while the saddle provides a guideway confining the table 3 to its relative longitudinal straight line path of movements.

The table 3, and the saddle 4, are propelled on their various movements by power derived from a rotary electric motor (not shown) through any suitable gearing transmissions M. As is diagrammatically shown in Fig. 9, the table 3 is provided with a lead screw 3a mounted in the saddle for rotation in either direction to propel the table to either the right (R) or left (L). Likewise, the saddle 4 is provided with a lead screw 4a mounted in the knee for rotation in either direction to propel the saddle and thereby the table 3 either in (In) or out (Out). The rotary lead screws 3a, 4a are each provided with its own electromagnetic clutch assembly comprising a pair of oppositely rotating electromagnetic clutches 48 designated (L) for left, (R) for right, (O) for out, and (I) for in movements of the table 3 when the clutches are rotating in the direction indicated by the arrows. Each clutch 48 comprises a beveled ring gear having fixedly supported within its bore the core and coil of an electromagnet. A pair of slip rings is attached to each electromagnet. The clutches 48 are rotatively mounted on extensions of the lead screws and are caused to rotate in opposite directions by the idler gear 48a. They are also held against objectional longitudinal movement. The clutches 48 receive power from the source by spur gears 48b, carried on a suitable shaft, which drive one of the clutches 48 through a driven spur gear 48c integrally mounted with the clutch 48. Armatures 49 are positioned between the clutches 48 and within their magnetic field. They are splined to the extensions of the lead screws 3a and 3b, respectively, to rotate said screws and are freely slideable longitudinally. Each electromagnetic clutch 48 has a separate tracer-controlled electric circuit connected by said slip rings, as will be well understood by those skilled in the art.

Figure 9:
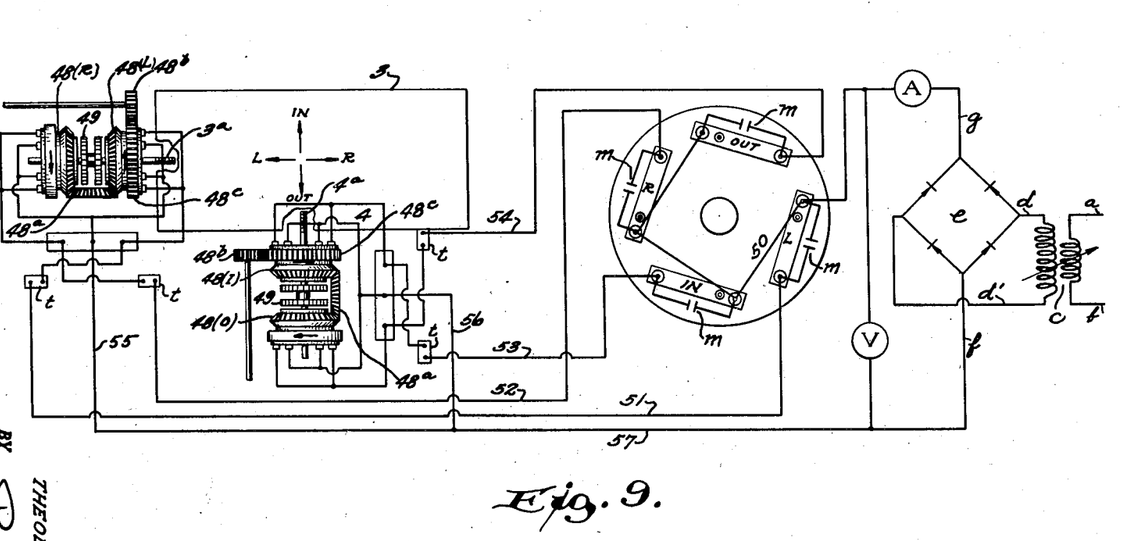
Fig. 9 diagrammatically indicates the work and pattern table and its lead screw and electromagnetic clutch assembly, and the saddle and its lead screw and electromagnetic clutch assembly, together with the four tracer switch units diagrammatically illustrated with the four electric circuits diagrammatically illustrated.

Thus, when clutch 48(L), for example, is energized by closing its separate controlling circuit, the armature 49 will be attracted to it and consequently rotated by said clutch thereby causing the lead screw 3a to rotate with the armature in the same direction as the clutch 48(L) shown by the arrow in Figure 9 to move the table 3 to the left (L). Clutches 48(R), 48(I), and 48(O) may be energized in a like manner to effectuate a movement of the table 3 in the direction designated right (R), In or Out, respectively. The table motion may be in minute steps along one or both of its coordinates of movement. Its movement may be continuous along one coordinate (leading), and in minute steps along the other coordinate. This results for practical purposes in motion along a curved path, or angular path relative to the longitudinal and transverse table movements.

The particular example of a preferred embodiment of my instant tracer mechanism invention disclosed hereby for purposes of explanation comprises a longitudinal upstanding supporting shank 15, alined with the central, vertical, longitudinal axis of said tracer mechanism that depends from said shank. This shank is rigid with the depending central, vertical stem or spindle 16.

The stem 16 extends through a central vertical hole in a switch-carrying disk or plate 17, which is normally rigid with and carried by said stem. In this specific example the stem provides an exterior longitudinal screw thread 18 on an intermediate portion of enlarged diameter in mesh with a threaded nut 19 engaging the central portion of the top face of disk 17 and clamping said disk rigidly against the top edge of a sleeve 20 fitting the lower end of the stem below said disk. The sleeve 20 is rigidly upheld on the stem 16 by the enlarged section or head 20a thereof.

The stem 16 constitutes the basic relatively fixed support for the longitudinally central depending tracer finger 21 and its pattern-scanning stylus 21a. The upper end of the tracer finger 21 is fixed to and depends from the center of a transverse crosshead in the form of a strong, rigid, normally horizontal disk 22 located normally in a transverse plane perpendicular to the longitudinal axial line of the tracer finger. This disk 22 provides a central depending hub 22a rigid therewith having an internally screwed bore extending therethrough and opening through the top face of the disk. The complementary screw-threaded upper end of the finger 21 extends through said bore with its upper end surface substantially flush with the top surface of said disk. If so desired a lock nut 22b can be threaded on the finger and tightened against the bottom end face of said hub 22a.

The tracer finger 21 and its crosshead 22 are supported from the stem 16 through the medium of a resilient diaphragm or disk 23 preferably formed by a circular, substantially flat, thin, resilient metal sheet (spring steel) having a central vertical hole receiving the lower end of stem 16 with the annular portion of the resilient diaphragm around said hole tightly clamped between the bottom edge of sleeve 20 and the top face of the head 20a. This provides a firm support for holding the diaphragm permitting it to flex without undue distortion. The annular marginal portion of said resilient diaphragm 23 is rigidly clamped between a top flat circular clamping ring 24, and the flat top surface of an upstanding annular marginal rim 25 on the disk 22. The ring 24 is held by screws 26 passing through the rim and the diaphragm 23 and screwing into the ring 24. A hard metal ball 27 is interposed between the top end of the tracer finger 21, and the center of the under side of the central rigid head 20a, to prevent upward axial movement of the crosshead 22, for purposes to be hereinafter described, and to permit the diaphragm 23 to be prestressed if desired. To accomplish this prestressing, the finger 21 may be screwed upwardly which springs the diaphragm downwardly. The finger 21 is then locked in its desired position by the back nut 22b. The upper end of the tracer finger is formed with an upwardly open centering and retaining socket 22c to maintain the ball 27 centrally on the stem 16. The ball also permits slight sliding movement of the top of tracer finger 21 as it pivots about its fulcrum. This movement also tends to increase tension in the disc 23 and acts as a dampener against vibration in the stem 21.

The resilient diaphagm 23 constitutes the supporting connection from the rigid vertical stem 16 to the normally horizontal crosshead disk 22 and maintains the downward spacing of disk 22 from the disk 17 and holds said disk 22 against sagging and at its limit of upward movement with ball 27 pressed against head 20a. Thus secured, the diaphragm resiliently resists distortion from its normal plane and hence resists lateral tilting of the tracer finger 21 in any lateral direction and returns such finger to substantially the same normal neutral or null position upon removal of any lateral tilting pressure sufficient to tilt the finger.

As has been previously described, there are four magnetic clutches 48 each having its own electric circuit and its own separate controlling switch. These four separate switches S are carried by the tracer mechanism and are uniformly fixedly spaced 90° apart in a circle concentric with and surrounding the central longitudinal axial line of the tracer stem, and, broadly, are fixedly located in the space between the normally parallel fixed disk member 17 and the tracer finger crosshead member 22, one member having the respective switches secured thereto and the other member provided with and carrying a corresponding series of similarly spaced switch operating or opening and closing devices, each complementary to its own particular switch, the arrangement being such that any selected one or pair of adjacent switches, and the complementary device or pair of devices, can be brought together into switch operating relationship by the relative tilting movements of the tracer finger crosshead with respect to the fixed member under the forceful lateral swing of the tracer finger on its fulcrum.

It will be noted that the central longitudinal tracer finger 21 and its crosshead 22 form a bell crank or right angle lever showing an infinite number of theoretical lever arms radiating from the bell crank fulcrum.

Figures 5, 6, 7, 8:
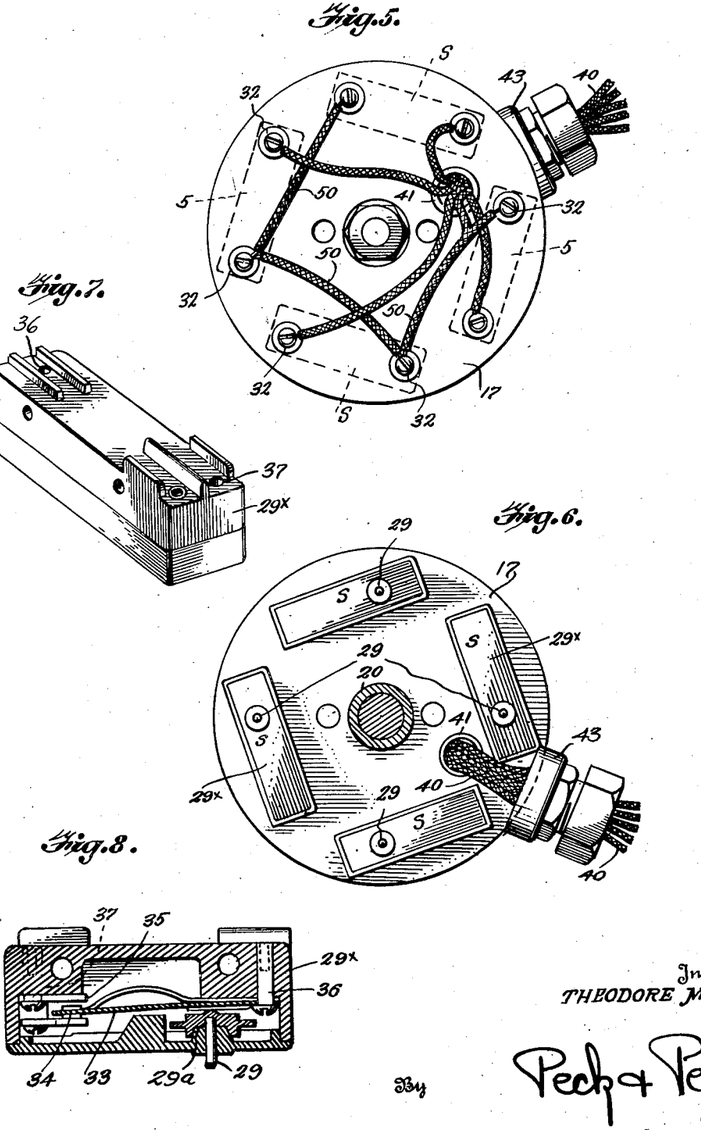
Fig. 5 is a top plan of the switch-carrying rigid disk of the tracer mechanism, the top hood not being shown.
Fig. 6 is a reversed or upside down view of the under side of the rigid switch-carrying disk and the switch units fixed thereon, showing bottom walls of said units and the operating plungers of said units.
Fig. 7 is a top perspective of one of the switch units.
Fig. 8 is a vertical longitudinal section more or less diagrammatically illustrating the internal spring switch tongue and spaced stop between which said tongue is movable.

The instant example embodiment utilizes the advantages gained by such relatively short-armed, quick-acting powerful bell crank leverage by fixedly securing the required number of similar uniformly spaced separate switch units S, to the fixed disk member 17 surrounding the projected axial line of the tracer finger. The switch units fixed to member 17 depend from the under side thereof normally out of operative relation to the marginal rim 25 of the tracer crosshead 22 when in normal position. The switch units S are fixed to the under side of the fixed disk 17 with their respective plungers 29 vertically depending from the under sides thereof. Each switch unit is so held in place by screws 32 passing through the disk 17. These screws which thread into terminals 36 and 37 also provide the terminal posts for wires 40 (Fig. 5) and 50, 51, 52, 53 and 54 (Fig. 9). These screws and wires are electrically insulated from disk 17. Each switch S is provided with an actuating plunger 29, axially longitudinally slidingly held in the switch housing 29X and having one end projecting from the exterior thereof. The opposite end of the switch plunger has an enlarged section or head, usually of an electrical insulating material, fixedly attached thereto, which restricts the plunger to limited outward movement relative to the switch housing. Relative inward movement of the switch actuating plunger with its head causes the head 29a to abut against the movable switch element 33, which is electrically connected to terminal 36. The switches S are normally open and when sufficient pressure is applied to the plunger 29 and thence to the blade 33, the free end of the blade 33 will snap from the normally open position, as shown in Fig. 8, to a position where the contact point 34 abuts against the contact point 35, which is electrically connected with terminal 37, thus closing the circuit. The movable switch element or blade 33 is under spring tension to snap back to open circuit position when switch closing pressure on the actuating plunger is relieved. Each switch actuating plunger 29 is arranged for engagement with and inward propulsion by a switch operating device.

The switch operating devices are in the form of four vertical switch tripping abutment posts 30 upstanding from the marginal rim portion 25 with the top abutment faces of said posts normally spaced downwardly from operative contact or relation with the respective plungers 29 with which they are alined. Each vertical post 30 is preferably longitudinally adjustable through the marginal rim 25; vertical holes for said posts being provided through the elevated rim 25, the marginal portion of the resilient diaphragm 23 and the top clamping ring 24. Each post is longitudinally screw-threaded and in mesh with its internally screw-threaded hole in marginal rim 25. Each post is provided with a bottom head 30a below the under side of the crosshead 22 for reception of a wrench or other tool to adjust the screw-threaded post by rotation in either direction in accurately locating the elevation of the top abutment surface thereof, with respect to its complementary switch plunger 29. A coiled expansion spring 30b is located on the screw or post and is compressed between the head 30a and the crosshead 22 to place the screw under tension against rotation under vibration.

The several insulated wires, here generally indicated as 40, by which said top terminals 37 are connected into the various clutch controlling and energizing circuits, are electrically secured to the top terminals and are gathered together on the top of disk 17 and passed to the under side of disk 17 through insulating bushing 41 fixed in said disk. The bundle of insulated wires 40 is then passed into the exterior electric cable or metal sheathing tube 42 from which said wires are distributed to establish and complete the four electric clutch circuits.

The exterior cable 42 is secured to the tracer mechanism through the medium of a strain relief 43. The strain relief is rigid with the disk 17 and projects radially from the under side thereof. The bunch of wires 40 enter the open inner end of said strain relief and pass outwardly therethrough into the tubular flexible cable.

If so desired, the tracer head can include a protective top hood or cover 45 in the form of a central strong disk having a depending annular marginal skirt having a vertical slot to receive and straddle the base portion of the strain relief 43. The top covering wall of this hood 45 is formed with a central hollow hub providing a bore to receive the lower end of shank 15, and the nut 19, and a base portion to rest on the central portion of the top face of disk 17 and to elevate the remainder of the bottom face of said wall to afford a space over the disk 17 to accommodate the wires 40. This hood is designed to cover and protect the disk 17 with its usually cylindrical, depending skirt surrounding and protecting the disks 17 and 22 and the space between said disks, leaving ample space for the free tilting movements of disk 22. The covering hood 45 is preferably secured to the rigid disk 17 by headed clamping bolts or screws 46, or the like, passing through the top wall of said hood and entering tapped holes in disk 17.

The tracer mechanism is preferably so arranged and replaceably locked to the tracer spindle of the machine tool that the plungers 29 of the two diametrically opposite switch units In and Out (see Fig. 9), for opening and closing the two separate energizing electric circuits of the respective electromagnetic clutches 48(I) and 48(O), will be located one at the front side of the tracer mechanism and the other at the rear side thereof. Likewise, the plungers 29 of the two diametrically opposite switches R and L (see Fig. 9), included, respectively, in the two electric circuits that control the electromagnetic gears 48(R) and 48(L), will be located one at the right side of the tracer mechanism and the other at the left side thereof along a diametrical line perpendicular to the diametrical line in which said In and Out switches are located. Thus, to close the switch Out, the tracer finger is forcibly swung rearwardly by lateral contact with the moving pattern, or by manual pressure of the hand, to forcibly tilt the rear portion of the crosshead 22 upwardly and thereby bring the upwardly moving rear tripping post 30 into lifting contact with the closing plunger 29 of the switch Out to thereby close the coil energizing circuit controlled by said switch and cause the Out propulsion of the table 3. This switch Out will remain closed so long as the lateral rearward tilting pressure is maintained against the tracer finger. When said finger is relieved of such pressure, the tracer finger and its crosshead instantly return to neutral position under the spring action of diaphragm 23 and the switch Out quickly snaps back to normal open position, whereupon clutch 48(O) is de-energized and the out motion of the table ceases. The other switches and circuits operate in like manner and further description is unnecessary.

As explained above, deflection of the tracer finger rearwardly relative to the table 3 results in an Out movement of the table. Likewise, by deflection of the tracer finger forwardly, relative to the table, an In movement of the table results. And by deflection of the tracer finger to the right, a Left movement of the table results; and by deflection of the tracer finger to the left, a Right movement of the table results. It will be noted that any lateral movement of the table is opposite in direction to any lateral pressure applied to the tracer finger. Thus, with the cutter and tracer spindles in lateral fixed relation relative to the machine frame or column 1, and with the table 3 moving laterally beneath them, an apparent or seeming motion of the cutter and tracer finger laterally of the table results. The cutter and tracer finger therefor apparently or seemingly move relative to the table 3 in the direction in which the tracer finger is deflected. Thus the operator may perform profile milling operations on a piece of work by manually applying deflecting pressure to the tracer finger substantially in the direction apparently required to effect exploration of the periphery of the pattern by the tracer finger. The actual paths of the apparent or seeming movement of the tracer stylus 21a and cutter are defined by maintaining the said tracer stylus abutted against the periphery of the pattern. Once such said exploration of the periphery of the pattern is begun one component of the required lateral tracer finger tilting or rocking pressure is applied by the hand of the operator, and the other pressure component is applied by abutment of the tracer stylus against the periphery of the pattern.

It will be seen, however, that relative to the machine frame or column 1, that the actual movement, in contradistinction to the apparent or seeming movement, is that of the pattern and work about the tracer stylus and cutter, respectively; rather than the tracer stylus and cutter about the pattern and work, respectively.

Figure 1:
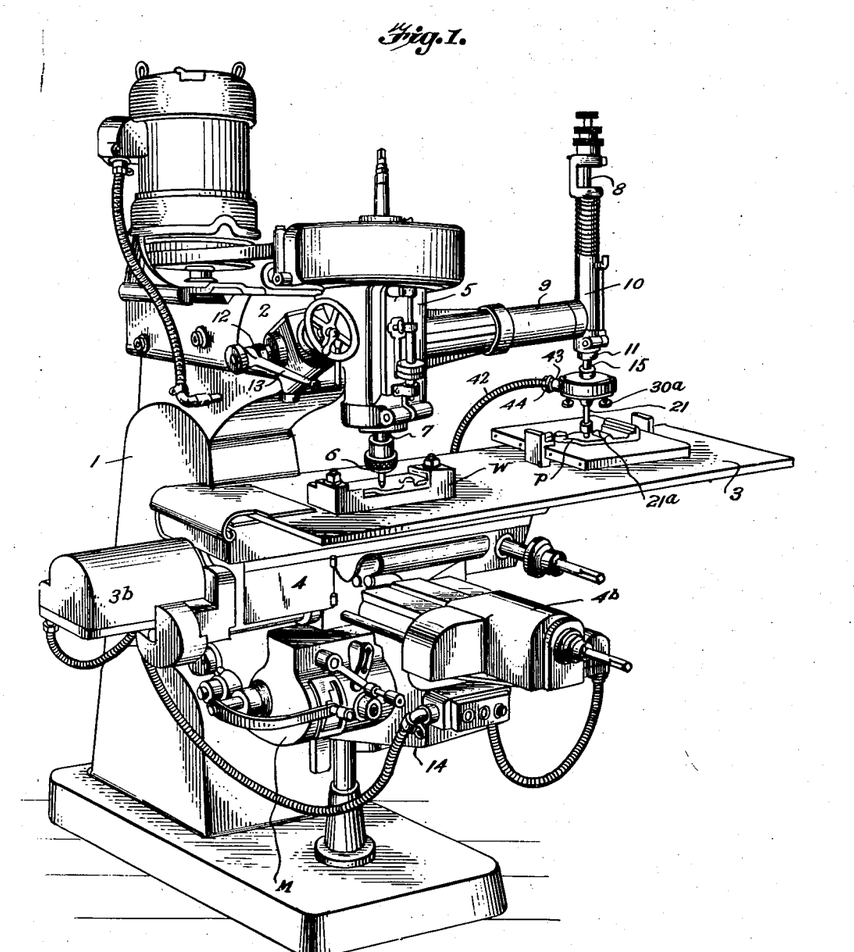
Fig. 1 is a front perspective of an example type of milling or duplicator machine to which my instant invention has been adapted and applied.
Figures 2, 3, 4:
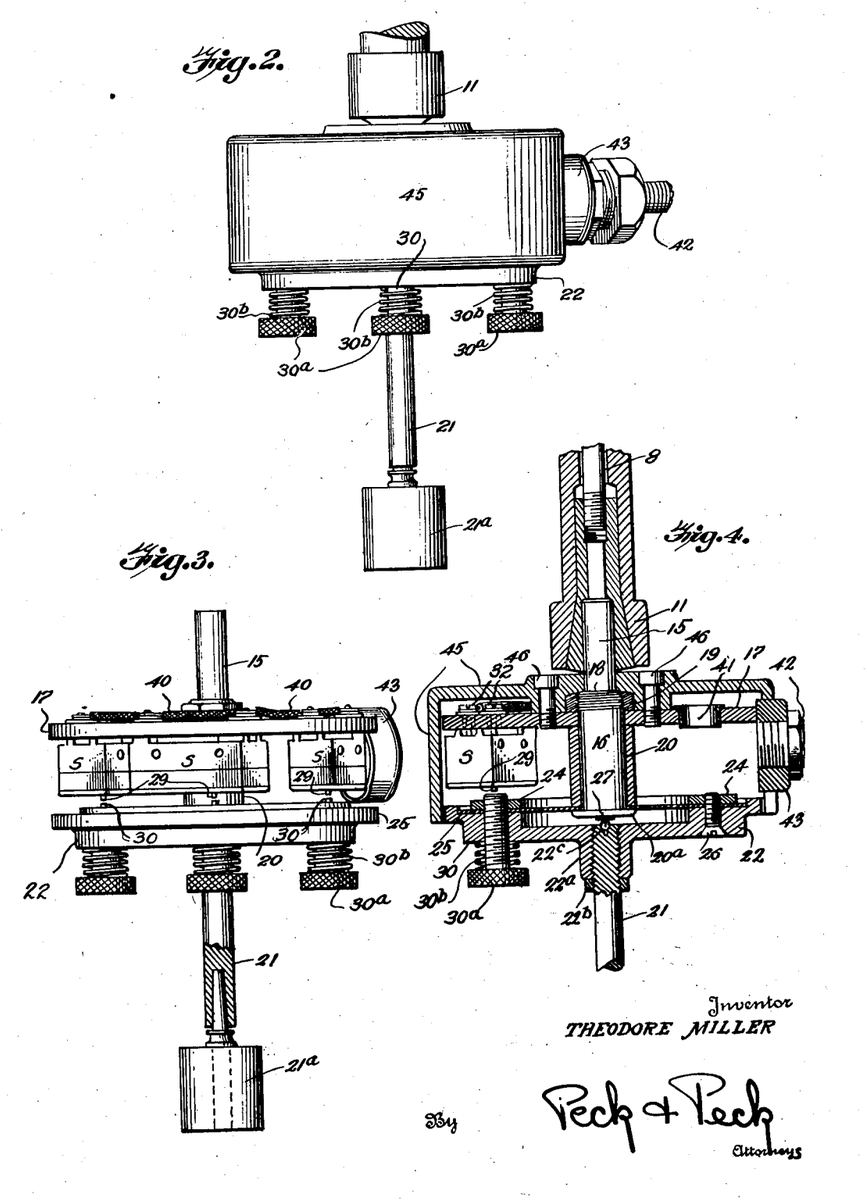
Fig. 2 shows the tracer mechanism in side elevation.
Fig. 3 is a side elevation of the tracer mechanism with the protecting hood removed.
Fig. 4 shows the organization of Fig. 2 in central vertical section.

Due to the inherent flexing characteristics of diaphragm 23, the tracer finger 21 and crosshead 22 would have limited movement parallel to the longitudinal axis of the tracer finger unless restrained therefrom. The need for such restraint may be understood by inspection of Fig. 3, where it is apparent that an upward pressure applied to tracer stylus 21a would cause the tripping members 30 carried by the crosshead 22 to close all four clutch circuits simultaneously, which result is undesirable in the normal operational functions of the machine. This undesirable motion is prohibited by the use of the steel ball 27 in the manner heretofore described. Thus the mechanical organization is arranged to suppress the said undesirable parallel straight line movements while retaining the desirable normal operational tilting or rocking movements of the tracer finger and its said integrally associated parts. Because of this organization, it is impossible to operate the crosshead to simultaneously close both In and Out switches S, or both Right and Left switches, but it is possible to operate said tracer and its crosshead to simultaneously close any combination of two adjacent switches S, such as switch In and switch R.

The ratio of lateral motion of the stylus 21a, and the vertical movement of the switch tripping members 30, can be of the order of about three to one. Approximately, this three to one ratio has in actual practice been very satisfactory where the switches S are actuated with a movement differential of approximately .0003″. With due allowance for deflection in the various parts, and a certain amount of necessary slack between the tripping members 30 and the switch operating plungers 29, the switches S are closed with an approximate maximum deflection of the stylus 21a of, say, about .0015″.

The structural organization of the instant tracer mechanism gains certain advantages over the tracer devices of the prior art, including increased compactness and shortened operative movements of parts at increased speed, among other advantages. The circumferential compactness of the instant tracer mechanism results from the inclusion therein of micro switch units S. This switch unit moves from open to closed position under a forced movement of its plunger 29 of approximately .0003″, thereby closing a contact gap of say .050″. Because of such short plunger movement, the length of the lever arm (crosshead 22) can be relatively short. In fact, the circumferential dimensions of the disks 17 and 22, and protective hood 45, are limited only by the required space therein or thereon for reception of the properly spaced four small switch units S.

The use of micro and like switches gains another advantage in addition to the structural advantage set forth above. It is practical to handle sufficient current at low voltage to operate the magnetic clutches 48 without employing the use of intermediate relays. This eliminates expense and simplifies the electrical circuit. Also the use of condensers m, together with the wide contact gap, eliminates any sustained arcing at the gaps.

Fig. 9 of the drawings diagrammatically shows the magnetic clutches, table, table lead screws, tracer switches, and the circuits in which they are employed. In this diagram, electrical means are disclosed for reducing the power current from any suitable source, for example, a 110 volt alternating power current, approximately to, say, a 9 volt direct current for energizing the electromagnetic clutch circuits. For this purpose I show any suitable transformer c of the variable type, the primary windings of which are electrically included in the power current lines a, b, while the secondary windings of said transformer are electrically connected through electric lines, d, d', into any suitable bridge rectifier e, or the electrical equivalent thereof, from which flows the desired low voltage direct current, for example, a 9 volt direct current, through main line g and return line f of the electromagnetic clutch energizing circuits.

One terminal of each of the four tracer switches is electrically connected to the main line g (in which is inserted an ammeter A) by the common wires 50. Each of the other terminals of the tracer switches are electrically connected as follows:

(a) Switch L, by wire 51 to normally closed limit switch t, then to a binding post of a terminal block and thence to the outer brushes of the magnetic clutch 48(L);

(b) Switch R, by wire 52 to normally closed limit switch t, to another binding post of the terminal block and thence to the outer brushes of the magnetic clutch 48(R);

(c) Switch In, by wire 53 to normally closed limit switch t, to a binding post of another terminal block and thence to the outer brushes of the magnetic clutch 48(I);

(d) Switch Out, by wire 54 to normally closed limit switch t, to another binding post of such terminal block and thence to the outer brushes of the magnetic clutch 48(O).

The inner brushes of the respective electromagnetic clutches 48 are electrically connected to the return line f as follows:

(a) The inner brushes of magnetic clutch 48(R) and the inner brushes of magnetic clutch 48(L) are connected by wire to a common binding post of the terminal block and by wire 55 to a common wire 57, which in turn is connected to return line f;

(b) The inner brushes of magnetic clutch 48(I) and the inner brushes of magnetic clutch 48(O) are connected by wire to a common binding post of the other terminal block and by wire 56 to the common wire 57 and return line f.

A volt meter V is positioned across the conductors g and f to visibly record the voltage across the circuit.

The normally closed limit switches t are of a conventional design and are each adapted to be operated by settable or adjustable stop devices propelled by the work table 3 or the saddle 4 to set and predetermine the limit movements of the work table and saddle and to stop the direction of movement whenever the limit in one direction is reached, as has broadly been the common practice in the prior art for many years. For example, the limit switch t appearing immediately below the magnetic clutch 48(R), as shown in Fig. 9, limits the movement of the table to the left. When the table 3 has moved its predetermined limit to the left under the control of a magnetic clutch 48(L), the normally closed switch t is opened to break the circuit to magnetic clutch 48(L) and thus stop the movement of the table in that direction. As the table is thereafter moved to the right under the control of the tracer switch R, the switch t, the action of which is here described, will resume its normal closed position, thus reestablishing the circuit to magnetic clutch 48(L) (provided tracer switch L is thereafter closed).

If so desired, condensers m can be included between the terminals of each of the tracer switches. The purpose of these condensers is to eliminate arcing at the switch contacts, particularly when the circuit is broken and an induced voltage is imposed on the opening contacts.

The curvilinear and angular movement of the table, as previously described, results from minute steps along one coordinate while there is more or less continuous movement along the other coordinate. The sensitivity of the tracer finger directly operating the tracer switches (themselves directly in the circuit of the electromagnetic clutches), effects such minute stepping that resultant movement of the table substantially describes a smooth, curved or angular line.

In this particular example, the operation of the tracer mechanism, to cause power propulsion of the work and pattern table in the selected direction, requires manual deflection or lateral tilting of the tracer finger in direction. In other words, the operator swings the tracer finger by hand in the proper lateral direction and thereby closes one switch, or, if necessary, two adjacent switches, through the medium of the complementary tripping element or elements 30, and such switch or switches will be maintained in position closing its or their respective clutch magnet energizing circuit or circuits so long as the tracer finger is held in its laterally tilted position against the pattern by the hand of the operator.

The switch closing tripping posts 30 employed in the instant example are separately and individually adjustable and settable toward and from their respective complementary switch plungers 29 to secure uniformity of spacing between all four plungers 29 and the top abutment ends of the four posts 30. This adjustability of said posts by reason of the preferably micromatic and self-locking characteristic of the screw-threaded connections between said posts renders exceedingly accurate adjustments possible, particularly as from time to time during continued machine operation it is sometimes necessary to re-adjust one or more of the posts to maintain the desired uniform spacing between the posts and plungers, particularly as the microswitches preferably employed are exceedingly sensitive, usually opening or closing their respective circuits by an axial plunger 29, movement of approximately about .0003".

This accurate and quick adjustability of the tripping posts 30 is of advantage in reducing the uniform spacing between all of the posts and plungers for slow machine work and in increasing the uniform spacing between the plungers and posts where the machine is operating on rough work at higher speeds, under which circumstances it is desirable to uniformly adjust all of the posts 30 downwardly with respect to the switch plungers to permit lateral swing of the tracer finger, say, for a distance of about .010 to .015 before the selected switch S is closed by operating contact of its post 30 with the switch plunger.

In the instant example embodiment, each switch unit S can be preferably released and removed laterally from its supporting disk 17 for repair or replacement by removing the clamping screws 32. The replacement or repaired unit S can be as easily applied and again clamped to the disk 17.

The tracer mechanism here disclosed can also operate successfully with other controls than the micro-switches shown. In place of the micro-switch the tracer could be adapted to close an ordinary pair of small gap contacts which in turn operate a relay circuit to close the main circuit for the magnetic clutches. It is also possible to use the tracer to operate small valves of a hydraulic system which causes the table to move as desired.

It should be understood that the foregoing detailed description of a preferred embodiment of the instant invention is for purposes of explanation of an example, and not for purposes of limitation of the appended claims except where so required by the prior art.

What I claim is:

1. Tracer mechanism provided with separate switches for control of separate electromagnetic clutch energizing electric circuits; said mechanism including a switch selecting and operating tracer finger; said mechanism providing a fulcrum about which said finger can be forcibly tilted in any lateral switch selecting direction; said mechanism providing resilient means positioned at said fulcrum and constantly acting in all directions radially of said tracer finger to yieldingly maintain said finger in its null central vertical position and to return the same thereto; said finger provided with a radially extending crosshead adapted to supply operational force to said switches along lines substantially parallel to the longitudinal axis of said finger.

2. Tracer mechanism including an operational means selecting horizontal crosshead member, means providing a centrally arranged fulcrum about which said member is vertically rockable to elevate and depress any diametrically opposite marginal portions of said member, resilient means positioned at said fulcrum constantly acting to yieldingly maintain said member in a null position, and a contouring tracer finger transversely arranged with respect to said crosshead for tilting said member.

3. Tracer mechanism comprising a tracer finger, a resilient disk supporting said finger for universal lateral movement, said disk alone continually urging said finger with sufficient force to quickly restore said finger to normal null position whenever outside deflecting pressure is removed, and means associated with said finger to operate control mechanism as said finger is oscillated.

4. Tracer mechanism comprising a tracer finger, a resilient disk supporting said finger for universal lateral movement, said disk alone continually urging said finger with sufficient force to quickly restore said finger to normal null position whenever outside deflecting pressure is removed, a lever arm supported for movement with said finger, and means associated with said arm to operate control mechanism as said finger is oscillated.

5. Tracer mechanism comprising a supporting stem; several spaced fixedly located switches for controlling several electromagnetic clutch energizing electric circuits; and switch selecting and operating devices including a longitudinal tracer finger, means providing a fulcrum for and alone yieldingly maintaining the finger in and returning the same to its normal central longitudinal position, said finger being forcibly tiltable in any lateral direction to select the particular switch to be operated, said finger provided with and fixed to a switch operating transverse crosshead having a switch-engaging portion rockable in a path substantially parallel to the longitudinal axis of said finger.

6. Tracer mechanism comprising a longitudinal supporting stem; normally fixedly located spaced switches for controlling several electromagnetic clutch energizing electric circuits; and switch selecting and operating means including a normally horizontal transverse crosshead provided and rigid with a tracer finger substantially in longitudinal alinement with said stem; a fulcrum between said stem and said finger and its crosshead about which said finger is forcibly tiltable in any lateral direction with simultaneous vertical rocking of said crosshead; and resilient means positioned at said fulcrum and supporting said finger and its crosshead from said stem and alone yieldingly maintaining said crosshead in its normal horizontal position and said finger in its normal vertical position and returning the same to such positions when forcibly rocked and tilted therefrom and then released.

7. Tracer mechanism including and supporting switches for controlling electromagnetic clutch energizing electric circuits; a central longitudinal supporting stem; a longitudinal tracer finger normally longitudinally alined with the axis of said stem and provided with a normally horizontal switch operating crosshead rocked vertically thereby on the tilting of the finger in any lateral direction; a fulcrum about which said finger is tiltable and its crosshead rockable; and spring means positioned at said fulcrum and alone yieldingly maintaining the finger and crosshead in normal positions.

8. Tracer mechanism comprising longitudinal fixed supporting means; a rockable control mechanism operating crosshead provided with a longitudinal tracer finger fixed thereto; and a thin transverse resilient metal sheet having its center fixed to said supporting means and its annular marginal portion fixed to the annular marginal portion of said crosshead to yieldingly support the finger and crosshead; said sheet being substantially imperforate between its places of connection with said supporting means and said crosshead; said sheet being under tension against distortion from its normal transverse plane by forceful tilting and rocking of the finger and crosshead and being sufficiently resilient to alone restore said finger to its null position.

9. Means for the tracer controlled electrical operation of a machine tool having a table movable toward the right and left and in and out, comprising four power-driven electromagnetic clutches for propelling said table in each of said four directions; four electric current clutch-energizing circuits, one for each clutch, all circuits provided with and including their own normally open circuit controlling switches; tracer mechanism including a manually operated contouring tracer finger yieldingly held in normal null position and in the normal operation of the mechanism tiltable laterally by manual force in any direction to select and cause temporary closing of any one of said switches, said switches being fixedly supported by said mechanism 90° apart around the normal longitudinal axial line of said finger; switch closing means operated by the manually forced lateral switch-selecting tilting of said finger, said clutches and circuits being so arranged that the table is propelled in a direction opposite to the direction of the forced tilting movement of said finger causing closing of the particular selected switch to bring about said table movement.

10. Tracer mechanism comprising a normally fixed support arranged transversely of the longitudinal axis of said mechanism; a transverse series of separate switch units arranged at the under side of said support in fixed spaced relation, said switches designed to control a corresponding series of electromagnetic clutch energizing electric current circuits; and switch selecting and operating means including a transversely arranged vertically rockable crosshead arranged opposite said transverse series of switches, and provided with a series of upstanding switch operating abutment elements complementary to said switches, said elements being separately longitudinally settable toward and from their complementary switches to attain spacing uniformity; a switch selecting and crosshead rocking tracer finger; and resilient means providing a fulcrum for and alone yieldingly maintaining said crosshead in its normally null position substantially parallel with and spaced from said transverse se- 11. Tracer mechanism comprising a supporting member, a relatively short tracer finger, a resilient metal disk interposed between said member and said finger for supporting said finger for universal lateral swinging movement about a fulcrum, a lever arm of shorter length than said finger supported for oscillatory movement about said fulcrum under control of said finger, said lever arm being arranged at substantially right angles to said tracer finger, and means associated with said finger and member to operate control mechanism as said finger is oscillated about said fulcrum.

12. A tracer mechanism comprising a supporting member, a crosshead, a resilient metal disc secured to said crosshead at opposite portions thereof, said disc being also secured to said supporting member, whereby relative rockable movement is permitted between said supporting member and crosshead, a relatively short tracer finger extending substantially perpendicular from said crosshead, and means carried by said supporting member and operable by said crosshead upon reciprocation thereof to operate control mechanism.

13. Tracer mechanism comprising a tracer finger, a resilient metal disc supporting said finger for universal lateral movement, adjustable means for prestressing said disc, and means associated with said finger to operate control mechanism as said finger is oscillated.

14. Tracer mechanism comprising a tracer finger, a resilient disc supporting said finger for universal lateral movement, a support for said disc, an adjustable abutment between said support and said finger to prevent flexure of said disc in one direction, and means associated with said finger to operate control mechanism as said finger is oscillated.

15. Tracer mechanism comprising a tracer finger, a resilient metal disc supporting said finger for universal lateral movement, said disc having openings in its peripheral edge, a clamping ring held against said edge by screws passing through said openings to hold said disc taut and cause tension therein when flexed, and means associated with said finger to operate control mechanism as said finger is oscillated.

THEODORE MILLER.

REFERENCES CITED

The following references are of record in the file of this patent:

UNITED STATES PATENTS

| Number | Name | Date |
| --- | --- | --- |
| 293,141 | Brotherhood | Feb. 5, 1884 |
| 1,172,525 | Hanchett | Feb. 22, 1916 |
| 1,668,518 | Shaw | May 1, 1928 |
| 1,772,431 | Shaw | Aug. 5, 1930 |
| 1,959,178 | Sassen | May 15, 1934 |
| 2,025,748 | Howe | Dec. 31, 1935 |
| 2,111,332 | Roehm | Mar. 15, 1938 |
| 2,199,465 | Martellotti | May 7, 1940 |
| 2,234,775 | Parsons | Mar. 11, 1941 |
| 2,310,373 | Rieper | Feb. 9, 1943 |
| 2,332,532 | Roehm | Oct. 26, 1943 |
| 2,334,956 | Ridgway | Nov. 23, 1943 |

FOREIGN PATENTS

| Number | Country | Date |
| --- | --- | --- |
| 330,882 | Great Britain | June 16, 1930 |
| 373,138 | Great Britain | May 17, 1932 |